United States Patent
Miyata et al.

(10) Patent No.: US 8,701,501 B2
(45) Date of Patent: Apr. 22, 2014

(54) ULTRASONIC FLOWMETER

(75) Inventors: Hajime Miyata, Nara (JP); Youichi Itou, Nara (JP)

(73) Assignee: Panasonic Corporation, Kadoma-Shi, Osaka (JP)

( * ) Notice: Subject to any disclaimer, the term of this patent is extended or adjusted under 35 U.S.C. 154(b) by 448 days.

(21) Appl. No.: 13/131,456

(22) PCT Filed: Dec. 16, 2009

(86) PCT No.: PCT/JP2009/006907
§ 371 (c)(1),
(2), (4) Date: May 26, 2011

(87) PCT Pub. No.: WO2010/070891
PCT Pub. Date: Jun. 24, 2010

(65) Prior Publication Data
US 2011/0238333 A1   Sep. 29, 2011

(30) Foreign Application Priority Data

Dec. 18, 2008 (JP) ................................. 2008-322153

(51) Int. Cl.
*G01F 1/20* (2006.01)
(52) U.S. Cl.
USPC ..................................................... 73/861.18
(58) Field of Classification Search
USPC ........................................ 73/861.25–861.28
See application file for complete search history.

(56) References Cited

U.S. PATENT DOCUMENTS

| 7,237,441 | B2 | 7/2007 | Umekage et al. |
| 7,360,449 | B2 | 4/2008 | Umekage et al. |
| 7,980,142 | B2 * | 7/2011 | Nakabayashi et al. ..... 73/861.27 |
| 8,418,566 | B2 * | 4/2013 | Gotou et al. ............... 73/861.18 |

FOREIGN PATENT DOCUMENTS

| CN | 101294833 A | 10/2008 |
| JP | 11-101674 A | 4/1999 |
| JP | 2001-141536 A | 5/2001 |
| JP | 2003-083791 A | 3/2003 |
| JP | 2004-132928 A | 4/2004 |
| JP | 2008-107287 A | 5/2008 |
| JP | 2009-276131 A | 11/2009 |

OTHER PUBLICATIONS

International Search Report for International Application No. PCT/JP2009/006907, dated Jan. 26, 2010, 2 pages.

* cited by examiner

*Primary Examiner* — Jewel V Thompson
(74) *Attorney, Agent, or Firm* — Brinks Gilson & Lione

(57) ABSTRACT

An ultrasonic flowmeter that measures flow velocity of a measured fluid by propagating ultrasonic waves through a measuring flow path with a rectangular cross section through which the measured fluid flows and the measured fluid that flows through the measuring flow path. The measuring flow path is provided with partition plates so that they are in parallel with the flow direction of the measured fluid. Simultaneously, the partition plates are placed in parallel with wall surfaces such that flow velocity distribution between opposing wall surfaces of the measuring flow path is more symmetrical with respect to the center of the flow direction of the measured fluid.

9 Claims, 8 Drawing Sheets

ULTRASONIC FLOWMETER

This application is a 371 application of PCT/JP2009/006907 having an international filing date of Dec. 16, 2009, which claims priority to JP2008-322153 filed on Dec. 18, 2008, the entire contents of which are incorporated herein by reference.

TECHNICAL FIELD

The present invention relates to an ultrasonic flowmeter.

BACKGROUND ART

FIG. 11 is a sectional view of the flow path of a conventional ultrasonic flowmeter. In FIG. 11, flow path 30 having a rectangular cross section is divided into multiple paths along opposing long sides of flow path 30 by multiple partition plates 31 to form multilayer flow path 32. Multilayer flow path 32 has approach flow paths 33, 34 linked thereto at upstream and downstream thereof.

Upstream chamber 35 and downstream chamber 36 forming a U shape together with flow path 30 allow each front end of approach flow paths 33, 34 to be positioned in a projecting state. Turnback plates 37, 38 are provided to regulate a flow. Regulating material 39 made of a porous material is provided to regulate a flow in multilayer flow path 32.

An ultrasonic transducer (not illustrated) is a means for sending and receiving ultrasonic waves. Ultrasonic transducers are provided at the opposing short sides of flow path 30 so that ultrasonic waves obliquely cross the flow direction of a fluid across flow path 30 at a certain angle with respect to the page surface.

Such a ultrasonic flowmeter calculates flow velocity on different occasions according to propagation time of ultrasonic waves sent and received by a pair of ultrasonic transducers; and multiplies the flow velocity by such as the cross-sectional area of the flow path as required to compute a flow rate (refer to patent literature 1 for instance).

With the configuration of a conventional ultrasonic flowmeter, however, a bend of the flow path and a local change of the cross-sectional area of flow path 30 cause an uneven flow at the bent part. When a measured fluid flows from the upstream side to the measuring part, vertically uneven flows are generated near the inlet of the measuring part, thereby preventing the fluid from evenly flowing into each layer.

This makes it difficult to measure the flow rate of the entire flow path using ultrasonic waves; and shows influence of the flow velocity distribution, resulting in different measuring precisions depending on flow velocity.

To increase the measuring precision of the ultrasonic flowmeter, additional components for flow regulation are required, thereby complicating the structure of the ultrasonic flowmeter. In mass-producing ultrasonic flowmeters, such components require additional worker-hours for example, which increases the production cost.

[Patent literature 1] Japanese Patent Unexamined Publication No. 2004-132928

SUMMARY OF THE INVENTION

An ultrasonic flowmeter of the present invention measures flow velocity of a measured fluid by propagating ultrasonic waves through a measuring flow path with a rectangular cross section through which the measured fluid flows and the measured fluid that flows through the measuring flow path. The measuring flow path has partition plates so that they are in parallel with the flow direction of the measured fluid. Simultaneously, the partition plates are placed in parallel with wall surfaces such that flow velocity distribution between opposing wall surfaces of the measuring flow path is more symmetrical with respect to the center of the flow direction of the measured fluid.

Consequently, even if a bend of a flow at the inlet of the measuring flow path generates an uneven flow, the measured fluid flows through the respective flow paths separated by the partition plates with symmetrical flow velocity distribution, which causes less measurement errors.

DETAILED DESCRIPTION OF THE PREFERRED EMBODIMENTS

Hereinafter, a description is made of some embodiments of the present invention with reference to the related drawings.

First Exemplary Embodiment

Figure 1:
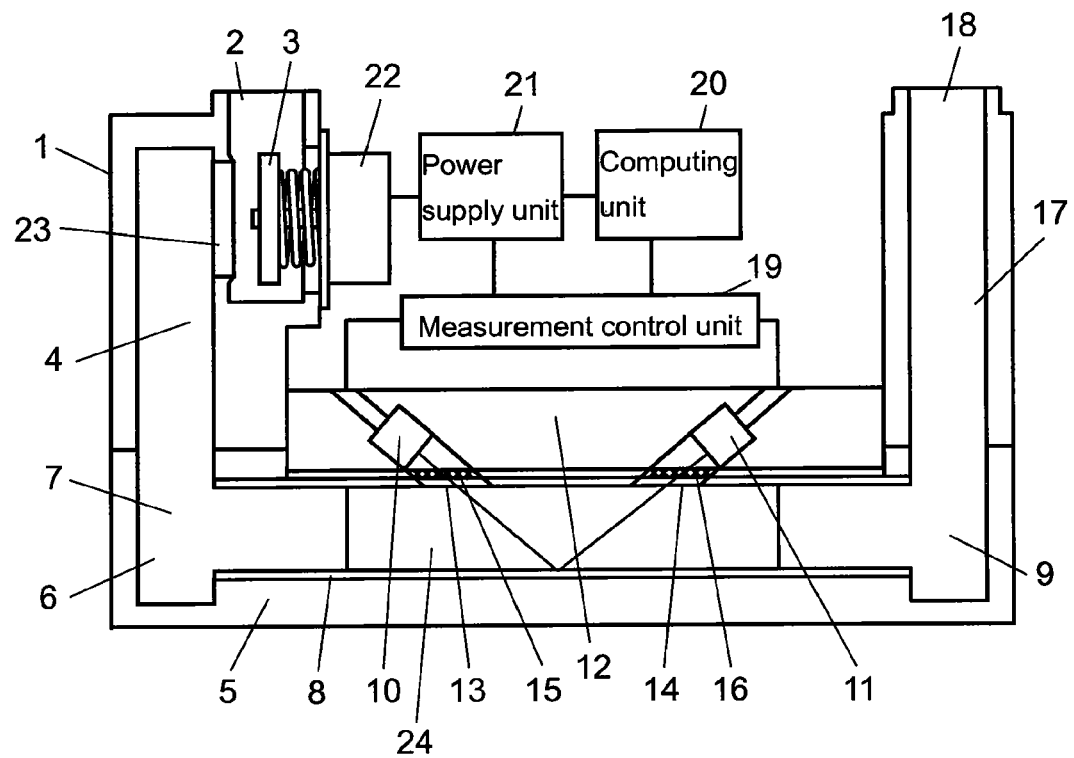
FIG. 1 is a cross-sectional view of an ultrasonic flowmeter according to the first exemplary embodiment of the present invention.

FIG. 1 is a cross-sectional view of an ultrasonic flowmeter according to the first exemplary embodiment of the present invention. The ultrasonic flowmeter of FIG. 1 is an example applied to a gas meter. The ultrasonic flowmeter includes introducing path 1 for a measured fluid; inflow opening 2; valve 3 (e.g. electromagnetic, stepping-motor); flow path 4 at downstream of the valve; flow path unit 5; and sensor unit 12.

Flow path unit 5 is composed of bend 6, measuring flow path inlet 7, measuring flow path 8, discharge bend 9, and a flow rate measuring unit. Bend 6 is connected to flow path 4 of introducing path 1. Measuring flow path 8 passes a measured fluid through inside the tube wall thereof and is formed roughly orthogonal to the central axis of flow path 4 of introducing path 1.

Here, flow path unit 5, introducing path 1, and a discharge path (described later) are formed as separate units and connected to one another.

The wall surface orthogonal to introducing path 1 is provided thereon with first ultrasonic transducer 10 and second ultrasonic transducer 11 obliquely at upstream and downstream of measuring flow path 8, where waves transmitted from them reflect on the opposing surface of measuring flow path 8 to be received. First ultrasonic transducer 10 and second ultrasonic transducer 11 are unified into sensor unit 12, which is integrally attached to measuring flow path 8. In other words, first ultrasonic transducer 10 and second ultrasonic transducer 11 are connected onto one surface of the tube wall of measuring flow path 8 along the flow direction of a measured fluid that flows through measuring flow path 8. Then, first ultrasonic transducer 10 and second ultrasonic transducer 11 emit ultrasonic waves to the measured fluid, and transmit the difference of propagation time between in the forward (the flow direction of the measured fluid) and reverse (the reverse direction of the flow direction) directions, to the flow rate measuring unit. The ultrasonic flowmeter thus propagates ultrasonic waves through the measured fluid that flows through measuring flow path 8 to measure flow velocity of the measured fluid.

The joint (i.e. propagation part of ultrasonic waves) of flow path unit 5 and sensor unit 12 is provided therein with openings 13, 14 for propagation. The opening part at sensor unit 12 is covered with wire meshes 15, 16 to prevent a fluid in measuring flow path 8 from flowing to sensor unit 12. Here, wire meshes 15, 16 may cover the opening part at flow path unit 5.

Discharge bend 9 has discharge path 17 connected thereto. A measured fluid (gas) flows out through flow-out opening 18 of discharge path 17. The ultrasonic flowmeter according to the first embodiment of the present invention has a U-shaped cross section.

The flow rate measuring unit is composed of measurement control unit 19 and computing unit 20. Measurement control unit 19 makes ultrasonic waves be sent and received alternately between first ultrasonic transducer 10 and second ultrasonic transducer 11. Then, measurement control unit 19 calculates the difference of propagation time of ultrasonic waves between in the forward and reverse directions, with respect to a flow of the measured fluid at certain intervals, to output the result as a propagation time difference signal.

Computing unit 20 receives the propagation time difference signal from measurement control unit 19 to measure flow velocity of the gas; and multiplies the flow velocity by the cross-sectional area of measuring flow path 8 and by a correction coefficient as required to compute a flow rate.

Further, power supply unit 21 is made of such as a lithium battery. Measurement control unit 19, computing unit 20, part of power supply unit 21, and drive unit 22 of valve 3 are attached to a space inside the ultrasonic flowmeter structured in a U shape.

In measuring flow path 8 having a rectangular cross section, partition plates 24 partition the cross section of the flow path where first ultrasonic transducer 10 and second ultrasonic transducer 11 send and receive ultrasonic waves, in parallel along the flow direction of the measured fluid, to make part of or entire measuring flow path 8 into two or more layers. Partition plates 24 are thus arranged on measuring flow path 8 in parallel along the flow direction of a measured fluid.

Hereinafter, a description is made of actions and effects of the ultrasonic flowmeter according to the embodiment of the present invention.

A gas as a measured fluid flows into the flowmeter from inflow opening 2 of introducing path 1 through external piping (not shown). The gas passes through opening valve 3, valve sheet opening 23, and bend 6; flows into measuring flow path 8 and to measuring flow path inlet 7 at downstream. The gas further passes through discharge bend 9 and discharge path 17 and flows out to external piping (not shown). Accordingly, placing introducing path 1 and measuring flow path 8 orthogonally with each other allows the piping direction of introducing path 1 and discharge path 17 to be vertical (U-shaped). This facilitates piping connection of introducing path 1 and discharge path 17 (i.e. external piping for a measured fluid) to measuring flow path 8.

As described above, the ultrasonic flowmeter according to the embodiment of the present invention has a structure formed by combining the attaching parts of the ultrasonic transducers and the measuring flow path part, both unitized. This brings about better assemblability. Further, to change the specifications of the flowmeter, only unit-level changes are required, which facilitates changing such as the structure.

Figure 2:
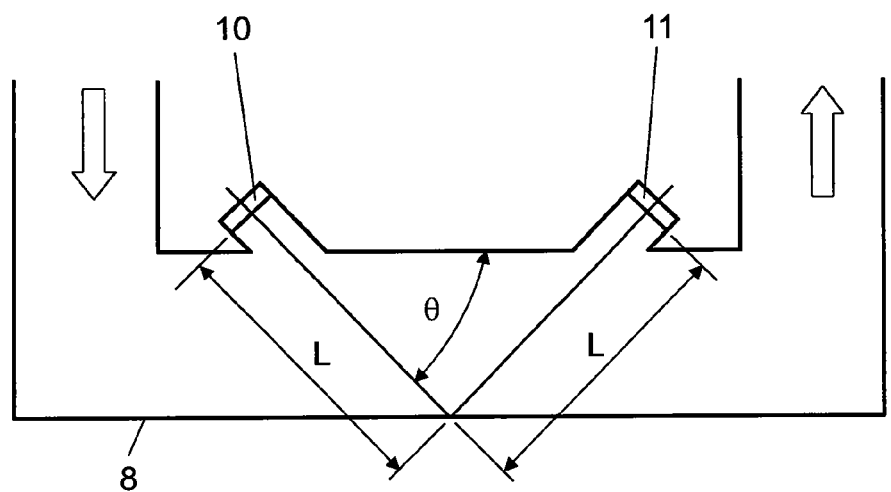
FIG. 2 is an explanatory diagram of operation of the ultrasonic flowmeter.

FIG. 2 is an explanatory diagram of operation of the ultrasonic flowmeter according to the first embodiment of the present invention. First ultrasonic transducer 10 and second ultrasonic transducer 11 are unitized and are placed on the same cross section of measuring flow path 8. Consequently, in the propagation path for sending and receiving ultrasonic waves, they are sent and received between first ultrasonic transducer 10 and second ultrasonic transducer 11 through a V-shaped propagation path where ultrasonic waves reflect on the opposing surfaces. In other words, the ultrasonic flowmeter according to the first embodiment of the present invention has first ultrasonic transducer 10 and second ultrasonic transducer 11 placed on a first surface, which is either of the two opposing surfaces of measuring flow path 8. Ultrasonic waves transmitted from either one of first ultrasonic transducer 10 and second ultrasonic transducer 11 reflect at least once on the second surface facing the first, and are received by the other ultrasonic transducer.

Thus attaching first ultrasonic transducer 10 and second ultrasonic transducer 11 onto the same surface of the tube wall of measuring flow path 8 makes the sensor unit be configured more easily. Using reflection makes the propagation path of ultrasonic waves longer, thereby increasing the measuring precision.

Measurement is made of propagation time T1 from when ultrasonic waves are emitted from first ultrasonic transducer 10 at upstream until when the waves are received by second ultrasonic transducer 11 at downstream. Meanwhile, measurement is made of propagation time T2 from when ultrasonic waves are emitted from second ultrasonic transducer 11 at downstream until when the waves are received by first ultrasonic transducer 10 at upstream.

Computing unit 20 calculates a flow rate by the following expression according to propagation time T1 and T2 thus measured.

Assuming that V is flow velocity of a gas in measuring flow path 8 in the flow direction; θ is an angle formed between the flow direction and the ultrasonic wave propagation path; 2*L is the distance between first ultrasonic transducer 10 and second ultrasonic transducer 11; and C is sound velocity in the gas (measured fluid), flow velocity V is calculated by the following expression.

$$T1 = 2*L/(C + V \cos \theta)$$

$$T2 = 2*L/(C - V \cos \theta)$$

In subtraction of the inverse of T2 from the inverse of T1, flow velocity V is given by eliminating sound velocity C.

$$V=(2*L/2 \cos \theta)(1/T1-1/T2)$$

θ and L are known, and thus flow velocity V is calculated from T1 and T2 values.

Since the flow rate of the gas is measured, assumption is made that angle θ=45 degrees, distance L=35 mm, sound velocity C=340 m/second, flow velocity V=8 m/second. Then, $T1=2.0*10^{-4}$ second and $T2=2.1*10^{-4}$ second, which means instant measurement is available.

Figure 3:
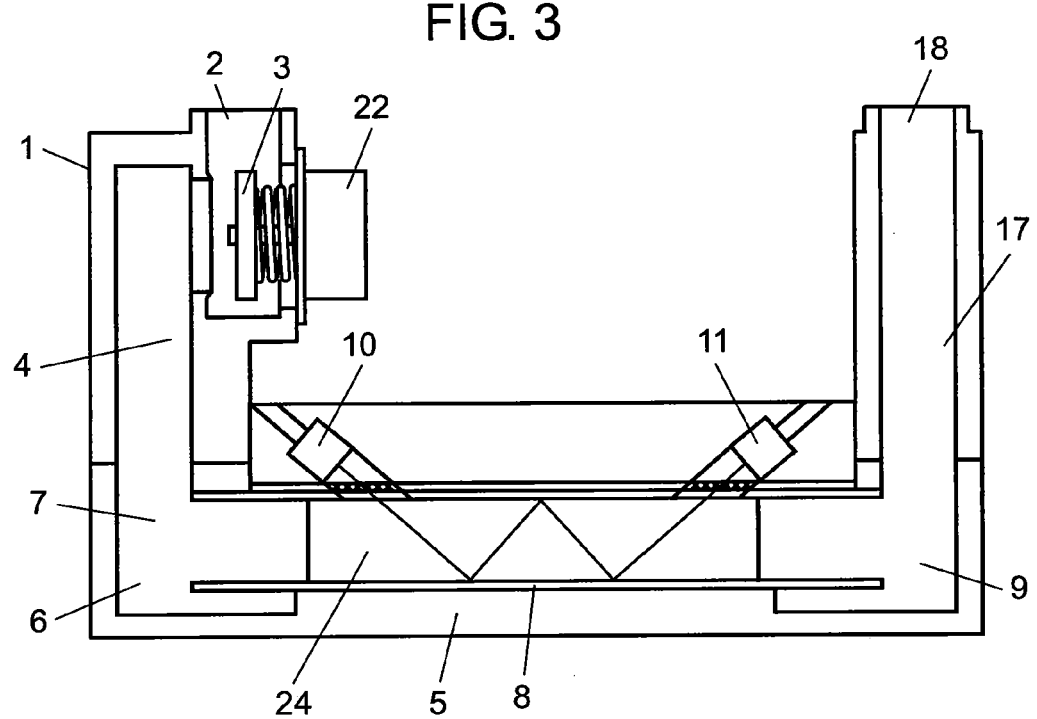
FIG. 3 is a cross-sectional view of another configuration of the ultrasonic flowmeter.

Other than a V-shaped propagation path, a W-shaped propagation path enables the same measurement, where the W-shaped propagation path uses three-time reflections, as shown in FIG. 3, which is a cross-sectional view of another configuration of the ultrasonic flowmeter according to the first embodiment of the present invention. That is, the propagation path of ultrasonic waves forms a W shape where three-time reflections are made on one surface of the wall surfaces of measuring flow path 8 and on the opposing surface.

Further, a W-shaped propagation path provides propagation time longer than a V-shaped one, which further increases measurement accuracy.

With the cross-section shape of measuring flow path 8 made symmetrical with respect to the center of the ultrasonic wave propagation path, measurement with the same accuracy is available for the reverse direction of a fluid as well as for the forward direction. Consequently, a phenomenon such as a pulsing stream can be measured.

In the first embodiment of the present invention, partition plates 24 partition measuring flow path 8 for multilayering. Advantages of multilayering are described.

Figure 4:
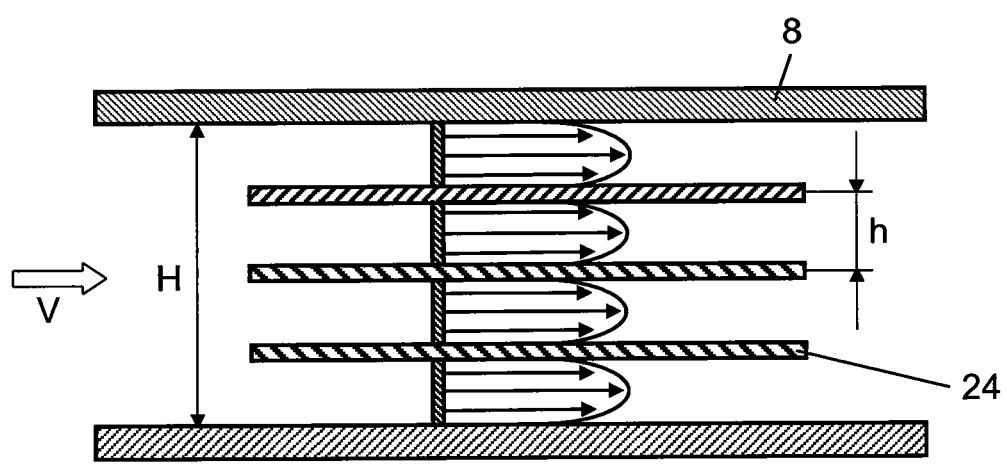
FIG. 4 is an explanatory diagram of flow velocity distribution in the multilayer flow path of the ultrasonic flowmeter.

FIG. 4 is an explanatory diagram of flow velocity distribution in the multilayer flow path of the ultrasonic flowmeter according to the first embodiment of the present invention. The multilayered flow path decreases the Reynolds number at the multilayered part for the same flow rate of a measured fluid flowing through measuring flow path 8. Accordingly, the measured fluid maintains a laminar flow even in a measuring range for large flow rates, thus reducing influence of turbulence, which enables stable measurement.

A smaller h in FIG. 4 makes a smaller Reynolds number, which generates a laminar flow. The Reynolds number is shown by the following expression.

$$R(\text{Reynolds number})=L*V/\nu,$$

where L is a representative length defined by height h and width of a flow path cross section, V is flow velocity, and ν is a kinematic viscosity coefficient.

Next, a description is made of a flow in the flow path.

Figure 5A:
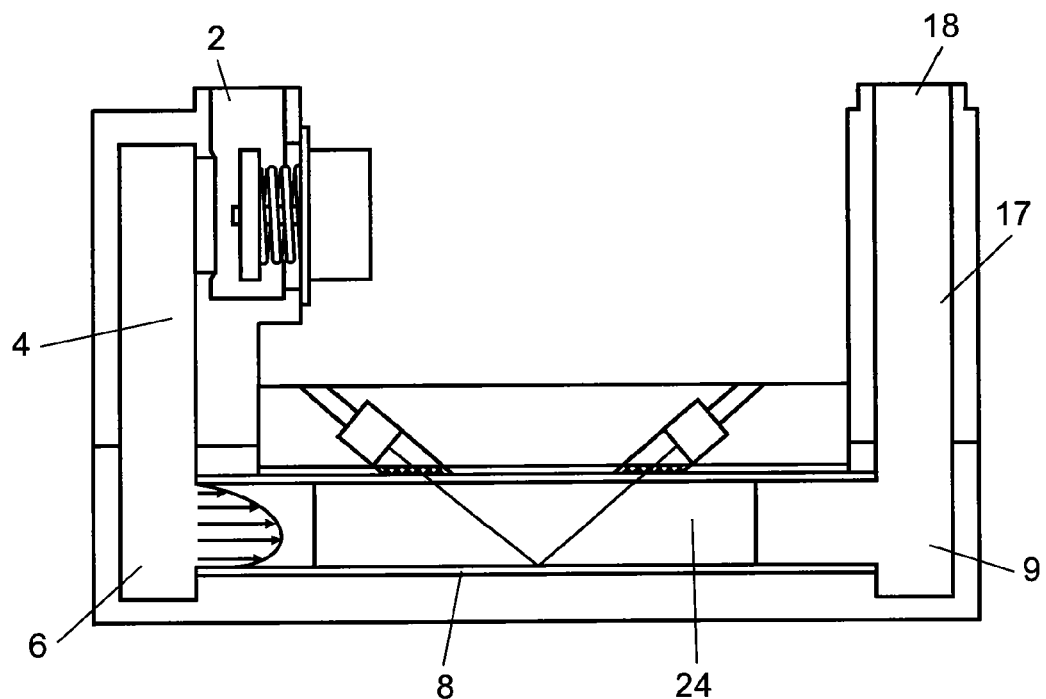
FIG. 5A is a cross-sectional view illustrating a flow in the ultrasonic flowmeter.
Figure 5B:
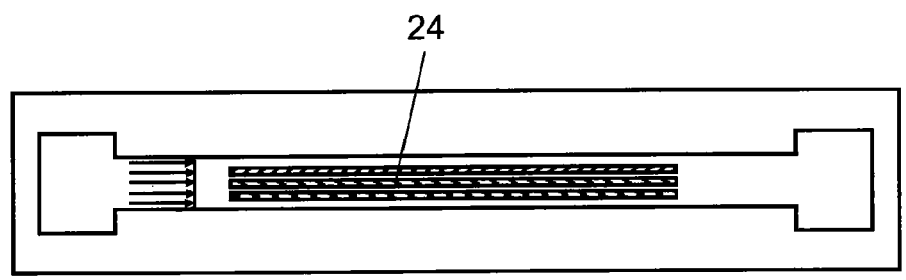
FIG. 5B is a plan view illustrating a flow in the ultrasonic flowmeter.

FIG. 5A is a cross-sectional view illustrating a flow in the ultrasonic flowmeter according to the first embodiment of the present invention. FIG. 5B is a plan view illustrating a flow in the ultrasonic flowmeter.

A measured fluid introduced through introducing path 1 creates a large imbalance in vertical flow velocity due to a sharp bend of the flow path when entering measuring flow path 8. At the inlet of measuring flow path 8, the vertical velocity distribution of the measured fluid loses its uniformity, creating an imbalance in the vertical direction of measuring flow path 8. Multilayering rectangular measuring flow path 8 by partition plates 24 causes a measured fluid with uneven flow rates to flow into each layer depending on the direction of an uneven flow.

In other words, if part of or entire measuring flow path 8 of the U-shaped flow path shown in FIG. 5A is partitioned vertically to the page surface by partition plates 24 for multilayering, an uneven flow in measuring flow path 8 causes different flow rates in each layer. This results in an error if measurement is not available such that ultrasonic waves propagate across the layers. Here, the U-shaped flow path is composed of inflow opening 2, flow path 4 at downstream of the valve, bend 6, measuring flow path 8, discharge bend 9, discharge path 17, and flow-out opening 18.

The flow velocity distribution at the inlet of measuring flow path 8 varies depending on the flow rate of the measured fluid, and thus the rate of an error to a true value varies depending on a flow rate. For this reason, it is difficult to correct measured values in the entire specified measurement range using only one flow rate measured.

As shown in FIG. 5B, in the first embodiment of the present invention, measuring flow path 8 having a rectangular cross section is divided into multiple layers by partition plates 24 vertically stood.

Contrarily to the vertical direction, in the depth direction of the page surface of FIG. 5A, imbalance in a gas flow hardly occurs. The multilayered structure produced by partitioning measuring flow path 8 having a rectangular cross section by partition plates 24 in the vertical direction allows the gas to flow into each layer of measuring flow path 8 evenly. Multilayering decreases the width of a gap per layer; the flow is complanate; and the change in flow velocity distribution is further reduced.

Further in the first embodiment of the present invention, the intervals between partition plates 24 are made equal. Consequently, measuring flow rates of part of the layers produces roughly the same result as that of the entire flow rate even if ultrasonic waves do not propagate through all the layers for measurement. This enables precise measurement of a flow rate, which is less subject to the influence of imbalance in vertical flow distribution.

Figure 6:
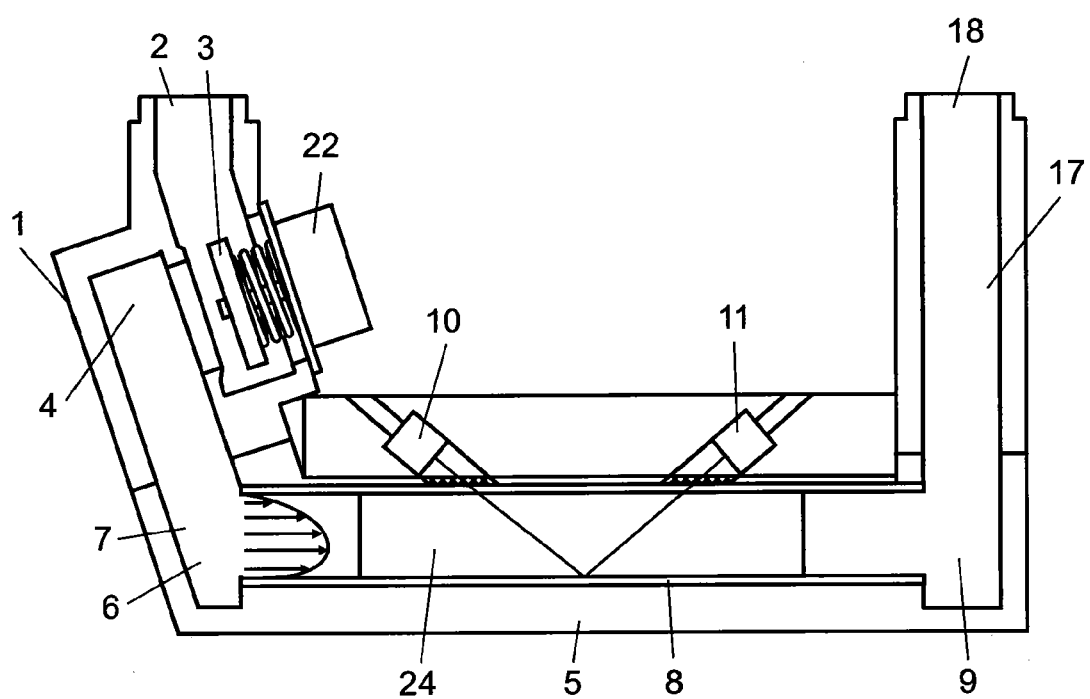
FIG. 6 is a cross-sectional view of yet another configuration of the ultrasonic flowmeter.

In FIG. 5A, flow path 4 at downstream of the valve perpendicular to measuring flow path 8 forms an L shape. As shown in FIG. 6, however, which is a cross-sectional view of yet another configuration of the ultrasonic flowmeter according to the first embodiment of the present invention, the shape may be other than an L shape. If measuring flow path 8 is inclined at a given angle with respect to flow path 4 at downstream of the valve, an uneven flow can occur at the inlet of measuring flow path 8, and thus partition plates 24 are placed so that the flow velocity distribution is more symmetrical. This reduces the influence of an uneven flow on measurement. In other words, partition plates 24 are arranged in parallel with wall surfaces such that flow velocity distribution between opposing wall surfaces of measuring flow path 8 is more symmetrical with respect to the center of the flow direction of a measured fluid.

Figure 7A:
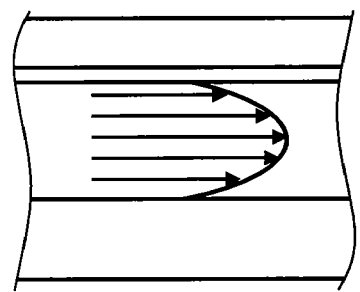
FIG. 7A shows flow velocity distribution on a cross section (vertical cross section) of the measuring flow path of the ultrasonic flowmeter.
Figure 7B:
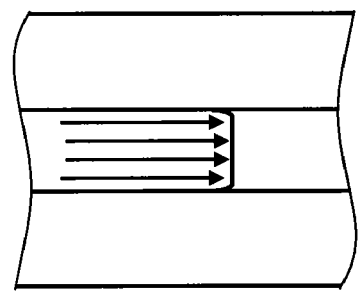
FIG. 7B shows flow velocity distribution on a cross section (horizontal cross section) perpendicular to the cross section of the measuring flow path in FIG. 7A.

FIG. 7A shows flow velocity distribution in a cross section (vertical cross section) of the measuring flow path of the ultrasonic flowmeter according to the first embodiment of the present invention. FIG. 7B shows flow velocity distribution in a cross section (horizontal cross section) perpendicular to the cross section of the measuring flow path in FIG. 7A.

In FIGS. 7A and 7B, flow path cross section flow velocity distributions A and B are respectively those at the centers of cross sections between two pairs of walls, with respect to the flow direction of measuring flow path 8. Both cross sections of flow path cross section flow velocity distributions A and B are perpendicular with each other.

As in low path cross section flow velocity distributions A and B, if imbalance with respect to the center is even, namely if the flow velocity distribution is evenly symmetrical with respect to the center, the wall-to-wall space (the cross section shown in FIG. 7B) with its shape of flow velocity distribution more flat (equal) is partitioned. Partition plates 24 are thus arranged so as to be in parallel with wall surfaces with flow velocity distribution more uniform out of the two flow velocity distributions between wall surfaces.

Such arrangement allows flow rates of a measured fluid flowing between multiple layers to be distributed uniformly. This reduces measurement unevenness of the ultrasonic flowmeter, which enhances reliability.

Second Exemplary Embodiment

Figure 8:
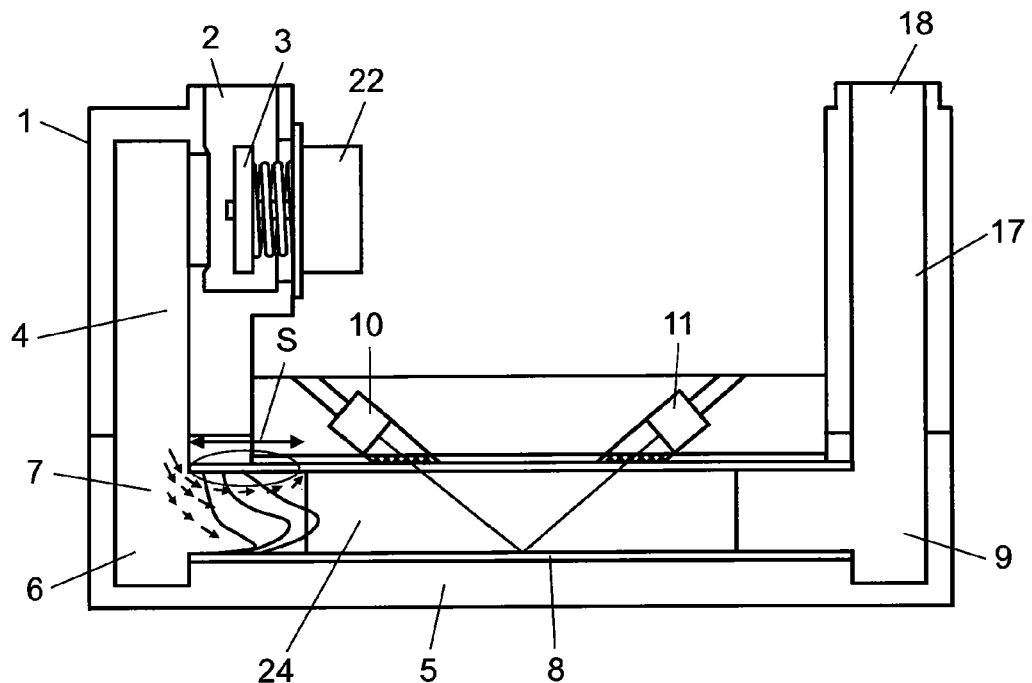
FIG. 8 is a cross-sectional view of an ultrasonic flowmeter according to the second exemplary embodiment of the present invention.

FIG. 8 is a cross-sectional view of an ultrasonic flowmeter according to the second embodiment of the present invention.

If flow path 4 at downstream of the valve is joined to measuring flow path 8 in an L shape, an uneven flow occurs at the inlet of measuring flow path 8. Large turbulence of a measured fluid due to an uneven flow causes an extremely turbulent state such as detachment of a measured fluid from a wall surface of the flow path at the inlet of measuring flow path 8 and generation of eddies. If ultrasonic waves propagate through this turbulent flow, the propagation is subject to the influence of the flow, which causes an unstable propagation waveform of ultrasonic waves. That is, bringing a propagation path of ultrasonic waves for measurement by an ultrasonic transducer into an area with low flow turbulence is effective for precise measurement.

As described above, to avoid the proximity of flow turbulence, ultrasonic transducers are desirably placed after the approach section (indicated by S in FIG. 8), which is a section from the inlet of measuring flow path 8 to a point where a flow is stabilized.

In the second embodiment of the present invention, partition plates 24 are placed after the approach section to solve the above-described problem. In other words, partition plates 24 are placed beyond the approach section. The approach section has a length from the inlet of measuring flow path 8 to a point where a measured fluid is detached from the inner wall surface of measuring flow path 8.

In the second embodiment of the present invention, the length of the approach section is five times or more of the interval partitioned by partition plates 24.

Figure 9:
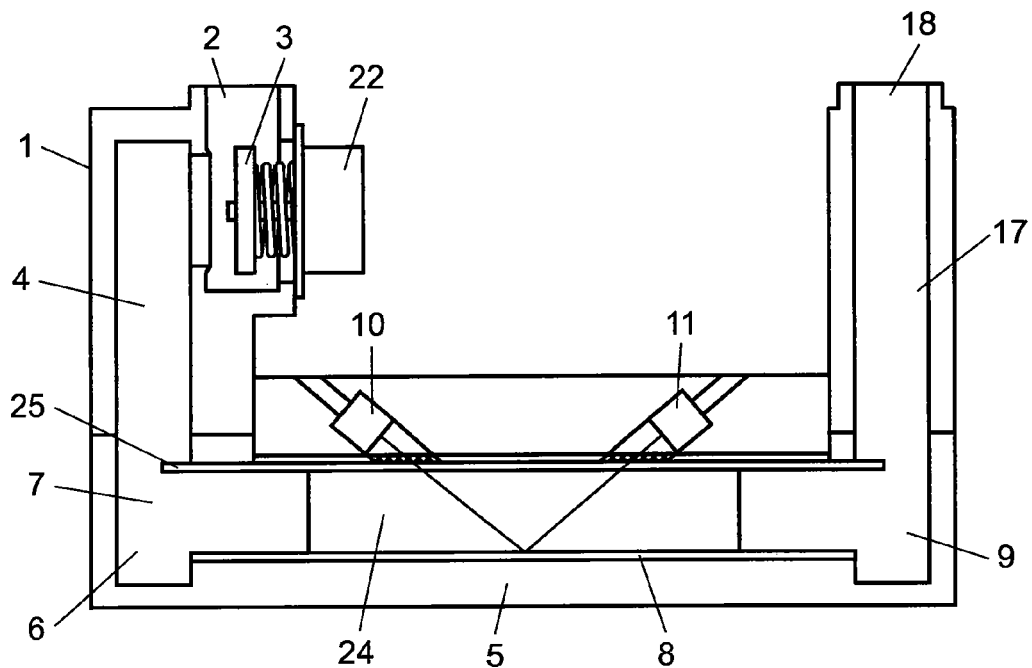
FIG. 9 is a cross-sectional view of another configuration of the ultrasonic flowmeter.

FIG. 9 is a cross-sectional view of another configuration of the ultrasonic flowmeter according to the second embodiment of the present invention. As shown in FIG. 9, baffle plate 25 unified with measuring flow path 8 is extended. More specifically, the wall surface of measuring flow path 8 has baffle plate 25 extending in the direction opposite to the flow direction of a measured fluid at the inlet of measuring flow path 8. Consequently, the approach section is extended by the length of baffle plate 25, which is effective when first ultrasonic transducer 10 and second ultrasonic transducer 11 are placed near measuring flow path inlet 7 for such as downsizing of the flowmeter.

Figure 10:
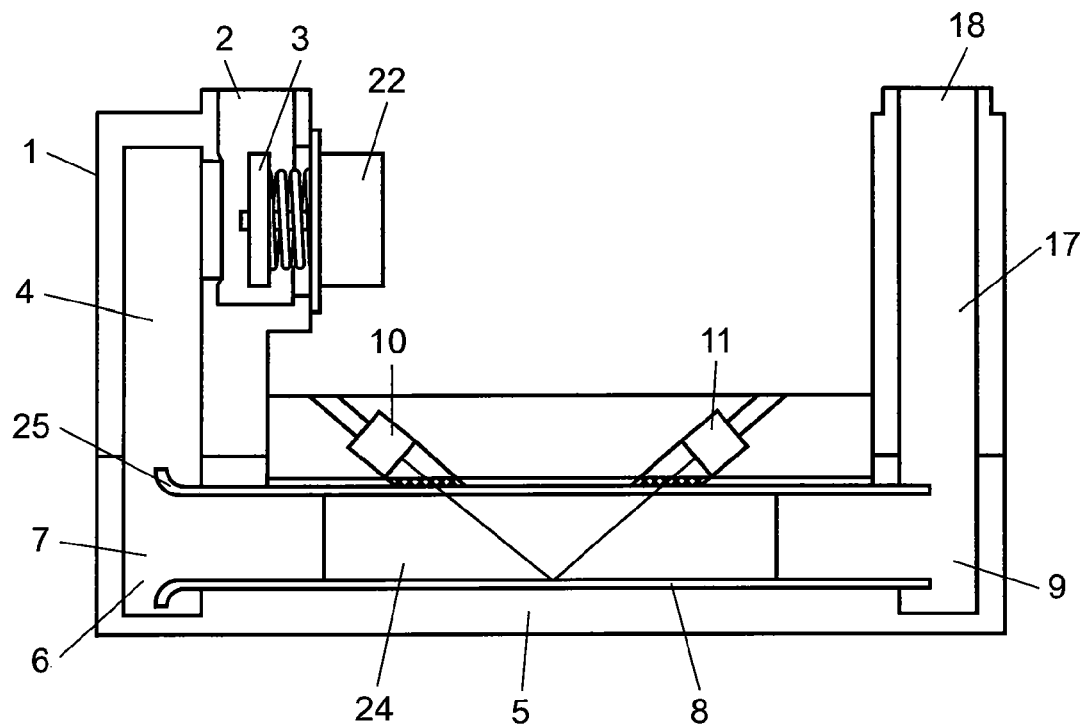
FIG. 10 is a cross-sectional view of yet another configuration of the ultrasonic flowmeter.
Figure 11:
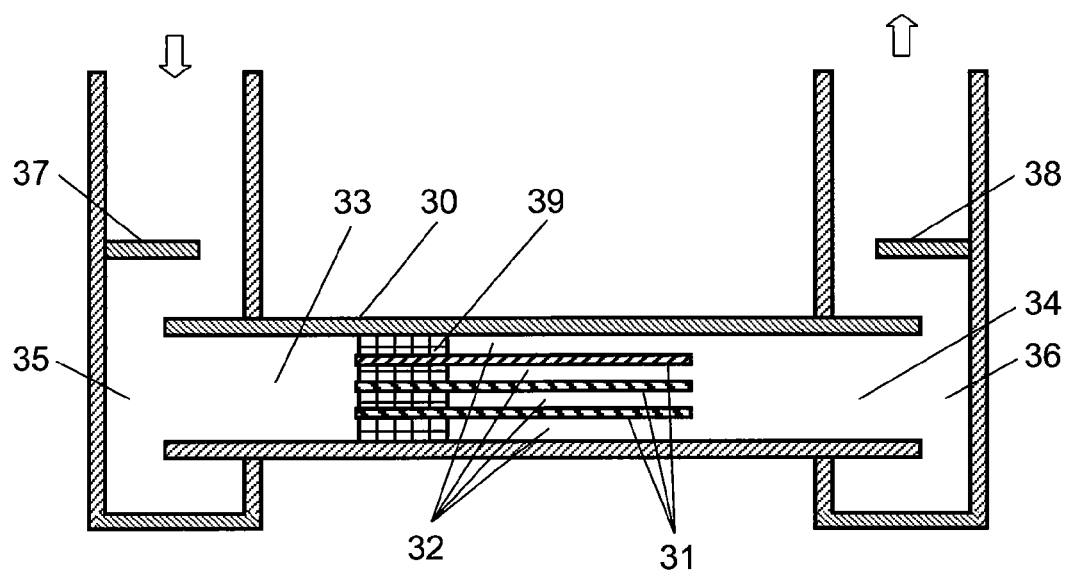
FIG. 11 is a sectional view of the flow path of a conventional ultrasonic flowmeter.

FIG. 10 is a cross-sectional view of yet another configuration of the ultrasonic flowmeter according to the second embodiment of the present invention. As shown in FIG. 10, the front end of baffle plate 25 has a horn-like arc shape open outward from the inside of measuring flow path 8. Consequently, a measured fluid is gently introduced along the arc-shaped wall surface of baffle plate 25 when the fluid flows into measuring flow path 8 even if flow path 4 at downstream of the valve is connected to measuring flow path 8 in such as an L shape. As a result, turbulence such as detachment of the fluid from the wall surface of measuring flow path 8 is less likely to occur, thereby allowing first ultrasonic transducer 10 and second ultrasonic transducer 11 to be placed with a high degree of flexibility, which facilitates downsizing of the flowmeter. Further, the less turbulence inside measuring flow path 8 allows reducing pressure loss at the measuring part.

Here, the radius of curvature of arc-shaped baffle plate 25 is preferably a half or more of the height of measuring flow path 8. This makes a measured fluid flow into measuring flow path 8 along the arc shape. Consequently, detachment of the fluid from the wall surface of measuring flow path 8 and turbulence are less likely to occur, thereby stabilizing the flow in measuring flow path 8. Further, the shorter approach section increases the degree of flexibility in placing first ultrasonic transducer 10 and second ultrasonic transducer 11. Still, reducing turbulence of a measured fluid allows reducing pressure loss.

INDUSTRIAL APPLICABILITY

As described above, the present invention is applicable in a wide range of fluids from a gas to a liquid such as water.

The invention claimed is:

1. An ultrasonic flowmeter comprising:
an inlet flow path;
a measuring flow path that is generally orthogonal to the inlet flow path with a rectangular cross-section through which a measured fluid flows;
a computing unit for measuring flow velocity of the measured fluid by propagating an ultrasonic wave through the measured fluid that flows through the measuring flow path; and
a plurality of partition plates provided to the measuring flow path so as to be in parallel with a flow direction of the measured fluid,
wherein the partition plates are placed in parallel with wall surfaces and separated from one another in a direction that is orthogonal to a longitudinal direction of the inlet flow path such that flow velocity distribution between opposing wall surfaces of the measuring flow path is substantially symmetrically balanced with respect to a center of the flow direction of the measured fluid.

2. The ultrasonic flowmeter of claim 1, wherein the partition plates are placed in parallel with the wall surfaces such that flow velocity distribution is more uniform out of two flow velocity distributions between the wall surfaces.

3. The ultrasonic flowmeter of claim 1, wherein the partition plates are placed at even intervals.

4. The ultrasonic flowmeter of claim 1, wherein the measured fluid flows into the measuring flow path through a bend.

5. The ultrasonic flowmeter of claim 4, wherein the partition plates are placed beyond an approach section having a length from an inlet of the measuring flow path to a point where the measured fluid is detached from an inner wall surface of the measuring flow path.

6. The ultrasonic flowmeter of claim 5, further comprising a baffle plate that extends from one of the wall surfaces of the measuring flow path in a direction opposite to the flow direction of the measured fluid at the inlet of the measuring flow path.

7. The ultrasonic flowmeter of claim 6, wherein a front end of the baffle plate is arc-shaped with a radius of curvature thereof a half or more of a height of the measuring flow path.

8. The ultrasonic flowmeter of claim 1, further comprising a first ultrasonic transducer and a second ultrasonic transducer placed on a first surface that extends along the measuring flow path, wherein the first ultrasonic transducer is configured to direct an ultrasonic wave towards a surface opposite the first surface, wherein the ultrasonic wave reflects at least one time off of the opposing surface prior to being received by second ultrasonic transducer.

9. An ultrasonic flowmeter comprising:
- a measuring flow path with a rectangular cross-section through which a measured fluid flows;
- a computing unit for measuring flow velocity of the measured fluid by propagating an ultrasonic wave through the measured fluid that flows through the measuring flow path; and
- partition plates provided to the measuring flow path so as to be in parallel with a flow direction of the measured fluid,
- wherein the partition plates are placed in parallel with wall surfaces such that flow velocity distribution between opposing wall surfaces of the measuring flow path is more symmetrical with respect to a center of the flow direction of the measured fluid; and
- a first ultrasonic transducer and a second ultrasonic transducer placed on a first surface which is either one of two opposing surfaces of the measuring flow path, and the ultrasonic wave transmitted by either one of the first ultrasonic transducer and the second ultrasonic transducer reflects once or more on a second surface facing the first surface and is received by the other ultrasonic transducer.

* * * * *